United States Patent [19]

Heckman et al.

[11] 4,059,400
[45] Nov. 22, 1977

[54] OVEN APPARATUS FOR SHRINKING THERMOPLASTIC SLEEVE WRAPS ON GLASS CONTAINERS

[75] Inventors: Russell William Heckman, Perrysburg; George Allen Nickey, Toledo, both of Ohio

[73] Assignee: Owens-Illinois, Inc., Toledo, Ohio

[21] Appl. No.: 672,228

[22] Filed: Mar. 31, 1976

[51] Int. Cl.² ............................................. F27B 9/14
[52] U.S. Cl. ................................... 432/124; 432/144; 432/146; 432/150
[58] Field of Search ............... 432/124, 144, 145, 146, 432/147, 149, 150; 34/4

[56] References Cited

U.S. PATENT DOCUMENTS

| | | | |
|---|---|---|---|
| 1,763,223 | 6/1930 | Cramer | 432/144 |
| 2,317,426 | 4/1943 | Wilson | 34/4 |
| 2,795,411 | 6/1957 | Court | 432/124 |
| 3,834,316 | 10/1974 | Amberg et al. | 432/124 |

*Primary Examiner*—John J. Camby
*Attorney, Agent, or Firm*—J. R. Nelson

[57] ABSTRACT

Apparatus for heat shrinking pre-oriented polyolefin plastic sleeves over the outer surface of a glass bottle. The bottles with sleeves in position thereon are gripped and suspended from rotatable chucks spaced along a movable conveyor means extending through an oven. The oven is constructed with a first zone of infrared burners directed at the mid body of the bottles and a succeeding second zone of infrared burners in upper and lower placement are directed at the neck and heel portions of the bottle, respectively. During travel past the burners, the bottles and sleeves are rotated at controlled speed to prevent collapse of the sleeve as it becomes heated. Opposite the burners is an exhaust section of the oven having plural sets of damper means, each set controlling air flow in plural vertically spaced horizontal rows of exhaust ports along the length of the oven. Air is drawn across the oven and over the conveyor chucks to aid directing heat on the sleeves and cool the chucks. The exhaust section includes fan means for drawing air in and over the oven through the ports and to an exhaust stack. The burners are mounted for vertical and angular adjustment with respect to the path of the bottles in the oven. The first zone of burners heats the annular mid part of the sleeve and shrinks that part firmly on the bottle body; and, through the control of exhaust air, some heat is applied to the upper portion of the sleeve, and by the same means, heat is kept from the lower portion. The second zone of burners adds enough heat to shrink the upper part of the sleeve onto the neck of the bottle, plus heat and shrink the plastic in the lower portion of the sleeve onto the heel and bottom of the bottle, but heat is directed so as not to damage the surface of the shrunken mid portion. High production rates are experienced with a relatively short span of oven utilizing the apparatus, and a superior finish of wrap over the outer surface of the bottle is achieved.

10 Claims, 7 Drawing Figures

OVEN APPARATUS FOR SHRINKING THERMOPLASTIC SLEEVE WRAPS ON GLASS CONTAINERS

The present invention relates to heating apparatus utilized in the manufacture of heat shrunken plastic wrap coverings on glass containers of the type disclosed in U.S. Pat. No. 3,760,968; and particularly of the type disclosed on FIG. 14 thereof.

BACKGROUND OF THE INVENTION

The process of our copending application, Ser. No. 672,082 filed Mar. 31, 1976, the same date as this application, entitled "Method of Heat Shrinking Thermoplastic Sleeve Wraps on Glass Containers" provides a need for a production apparatus to produce the shrunken sleeve wraps of the polyolefin type material on bottles.

The plastic wrapped containers are processed in accordance with the disclosure of copending application Ser. No. 672,229 filed Mar. 31, 1976, the same data as this application, now U.S. Pat. No. 4,016,706, both being owned by a common assignee. To control the shrinkage of the heat contractible plastic on the containers (disclosed in the form of glass bottles) at production speed and with esthetically suitable finish on the wraps, which are neither scorched, burned, folded or deformed in the heat shrinking step, a novel apparatus for heat shrinking the sleeve wrap is needed.

After the sleeve is placed on the bottle, they are carried together into the oven device by a straight line conveyor, and therein the shrinking heat is applied such that it does not deface or damage the printing on the outer facing surface of the sleeve, yet the shrinkage must be performed relatively quickly and in controlled fashion to maintain a good production rate (speed) in a reasonable span of oven and shrinkage of certain plastic materials in use today, which are most difficult to control. The plastic wrap must be done so as to provide a smooth and esthetically pleasant appearance in the final wrapped bottle. Marginal control of the shrunken wrap is required to avoid wavy tops or foldover in the sleeve. Satisfactory surface appearance of the final wrap shrunken on the bottle is a requirement.

SUMMARY OF THE INVENTION

The present invention has devised an oven apparatus for heat shrinking modern plastic wraps on containers, such as glass bottles, under the conditions discussed, to achieve the foregoing criteria. The glass bottles are conveyed to the oven in a vertical upright position with the plastic sleeves thereon which were placed thereon after the bottles were preheated to a temperature in the range of 150°-250° F; normally 150°-180° F works well.

In U.S. Pat. No. 3,843,316, there is disclosed a machine and conveyor utilized for the production of heat shrinkable plastic sleeves on articles, such as bottles, in which the bottles are gripped and suspended from the conveyor means by rotatable chucks thereof on spaced centers along the conveyor.

In the oven, the bottles traveling the length thereof are subjected to two or more zonal heating applications, described herein as the first and second control zones of the heating. Of course, the zones could be increased to more than two to accomplish shrinking the wrap on different complex bottle shapes.

The bottles are rotated each about its axis as they enter the first control zone of the oven by apparatus disclosed in copending application Ser. No. 672,227 filed Mar. 31, 1976, the same date as this application and owned by a common assignee. In this first zone of the oven, an elongated bank of horizontally arranged infrared burners are set to a height that will be opposite the mid body (the large diameter section) of the bottle. The distance and angle of the burners are controlled precisely by their mounting on the oven structure so as to apply the heat zonally to shrink an annular band-like portion of the plastic sleeve on the bottle mid body. During this heating step, the bottles and sleeves are rotated in a manner disclosed in the aforementioned copending application maintaining the portions of the sleeve above or below the mid body (which become limp and pliable with heating) erect and straight to prevent foldovers. A foldover is caused when the plastic sleeve wrap in a limp condition is allowed to sag or slump (collapse) before shrinking annularly onto the bottle. In the first zone just described, some care is taken to keep as much heat as possible off the top and lower portion of the wrap until the mid body portion is shrunken into position.

A second control zone adjacent the downstream end of the first zone comprises a horizontal bank of burners at an elevation opposite the upper portion of the sleeve wrap and angled to be directed onto the neck region of the bottle. Another horizontal bank of burners is mounted at an elevation opposite the lower end of the sleeve and angled at the heel (lower radius portion of the body blending to the bottom). The second zone burners may be coextensive or one lead the other (be ahead of the other) as the situation dictates in the shrinking of the sleeve. The basic premise of the invention is based upon the apparatus for first shrinking the mid body into place and then shrinking the wrap progressively in the axially disposed portions on either side of the mid body of the bottle.

The aforementioned rotational speed of the wrap and container, burner position opposite the sleeve wrap and heat intensity effectively deal with the foldover problem.

The invention employs infrared heat which shrinks the plastic wrap faster than other means of heating; on the order of one half the time required by a hot air oven. The apparatus provides better production rates with less floor space and equipment being utilized. The shorter shrink times available avoid damage of the decoration and deterioration of the inks from overheating. The invention operates readily for producing full height wrapped and substantially shrink plastic encapsulated bottles at production line speeds in the range of 100-300 BPM.

Other advantages and features of the invention will be more readily apparent to those skilled in the art from the following detailed description of the drawings, which illustrate an apparatus for carrying out the method of the invention, on which:

DESCRIPTION OF THE INVENTION

Figure 1:
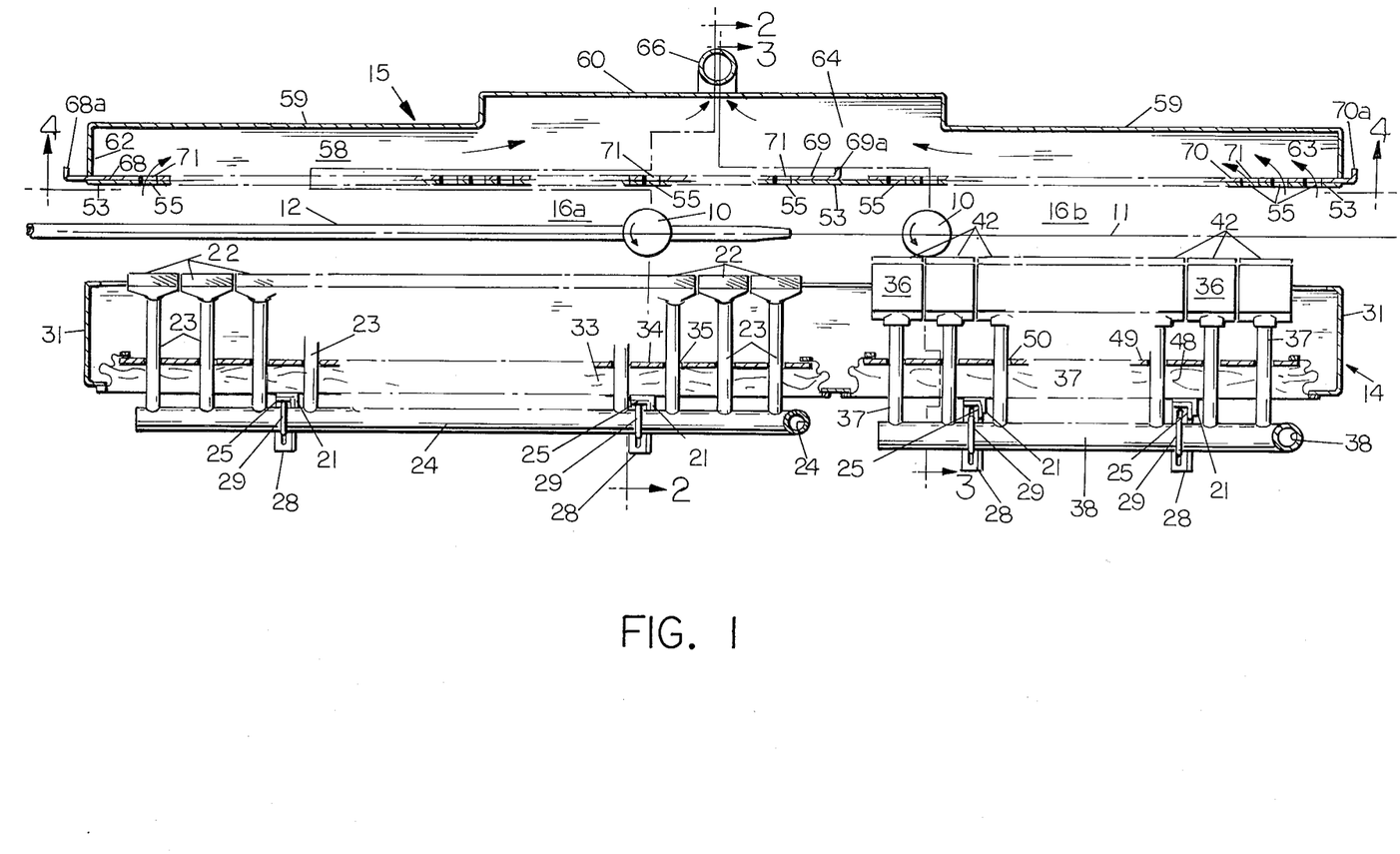
FIG. 1 is a sectional top plan view of the oven apparatus for heat shrinking contractible plastic sleeve wraps onto glass bottles according to the invention.

Referring to FIG. 1, bottles with plastic sleeves fitted loosely thereon, indicated at 10, are carried on a conveyor which travels in a horizontal path indicated by line 11 extending through the length of the oven. During the initial stages of travel, the plastic sleeves are supported against vertically dropping out of position on the bottle by an underlying support bar 12 that is water cooled.

In a preferred form, the plastic sleeves 13 (FIGS. 2 and 3) are made in a hollow cylinder-like form from the pre-printed sheet of a plastic highly oriented in the circumferential dimension of the sleeve. There may be some orientation in the cross dimension, which corresponds with the height of the sleeve.

The plastic material used in making the shrinkable sleeves for wrapping the bottle surfaces varies from a foamed polyethylene of high or low density type, a polystyrene foam laminated with a polyolefin or copolymer of olefin (e.g. ethyl ethylene acrylate) in form of a film, a polyethylene foam/polyethylene film laminate or similar types of polyolefins. The plastic wrap material is formed into sheet that is highly oriented in the machine (M) dimension and of as low orientation as is practical in the transverse (T) dimension, such that the ratio of orientation or shrinkage of M/T is 2.0 or more; preferably on the order of 7.0–9.0. Typical orientation shrink values are above 30% shrinkage in the M dimension and preferably 60–80%, and 0–15% shrinkage in the T dimension. The oriented sheet material, laminated or otherwise, is next "flat" printed with a decoration and/or label print using present inks and color materials. The printed stock, trimmed to a web and in rolls, is processed in the machinery through a sleeve former such that the circumference of the formed sleeves is along the M dimension of the oriented plastic web. The sleeves are just slightly larger on their inner circumference than the outer circumference of the largest part of the bottle.

The need for the present invention arises most actuely in the use of polyolefin materials or copolymers of olefins. The foamed polyethylene is on the order of 0.010–0.020 inches in thickness, and if a laminated foam/film is used, the skin is 3–5 mils in thickness included as part of the composite thickness range of 0.010–0.020 inches.

The general properties of the described materials in contraction (shrinking) is to achieve upon heating a first pliable, limp state at which time the sleeve has a tendency to sag, slump or fold (collapse), and this is followed after additional heating rather suddenly by the shrinking reaction.

Figure 2:
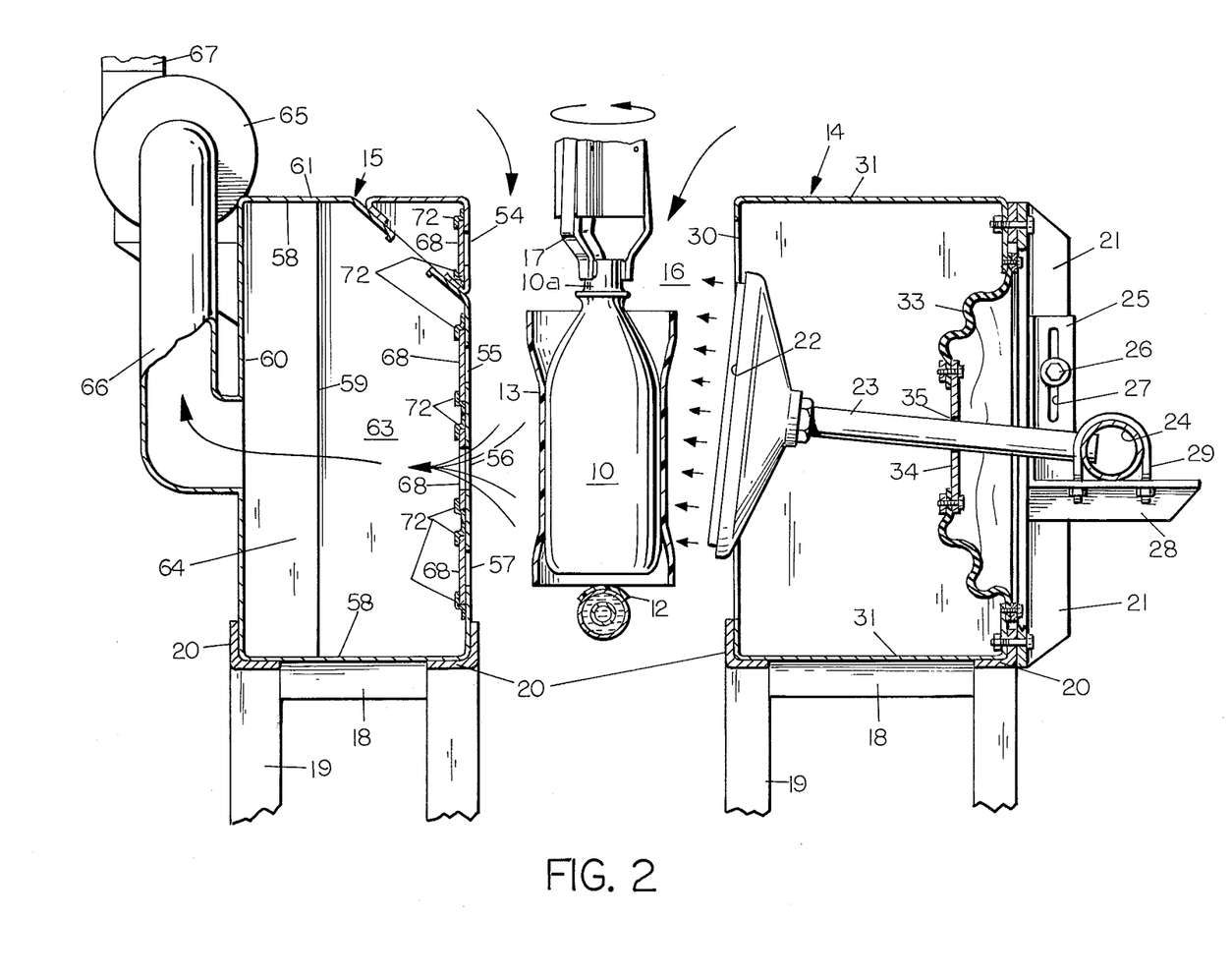
FIG. 2 is an end sectional elevational view in the first control zone of the oven taken along line 2—2 on FIG. 1.

As seen on FIG. 2, the plastic sleeve 13 is placed over the bottle in a loose fit such that the inner circumference of the sleeve 13 is just slightly more than the exterior circumference of the bottle 10 at its largest portion, which usually occurs in the mid-portion of the bottle.

Figure 3:
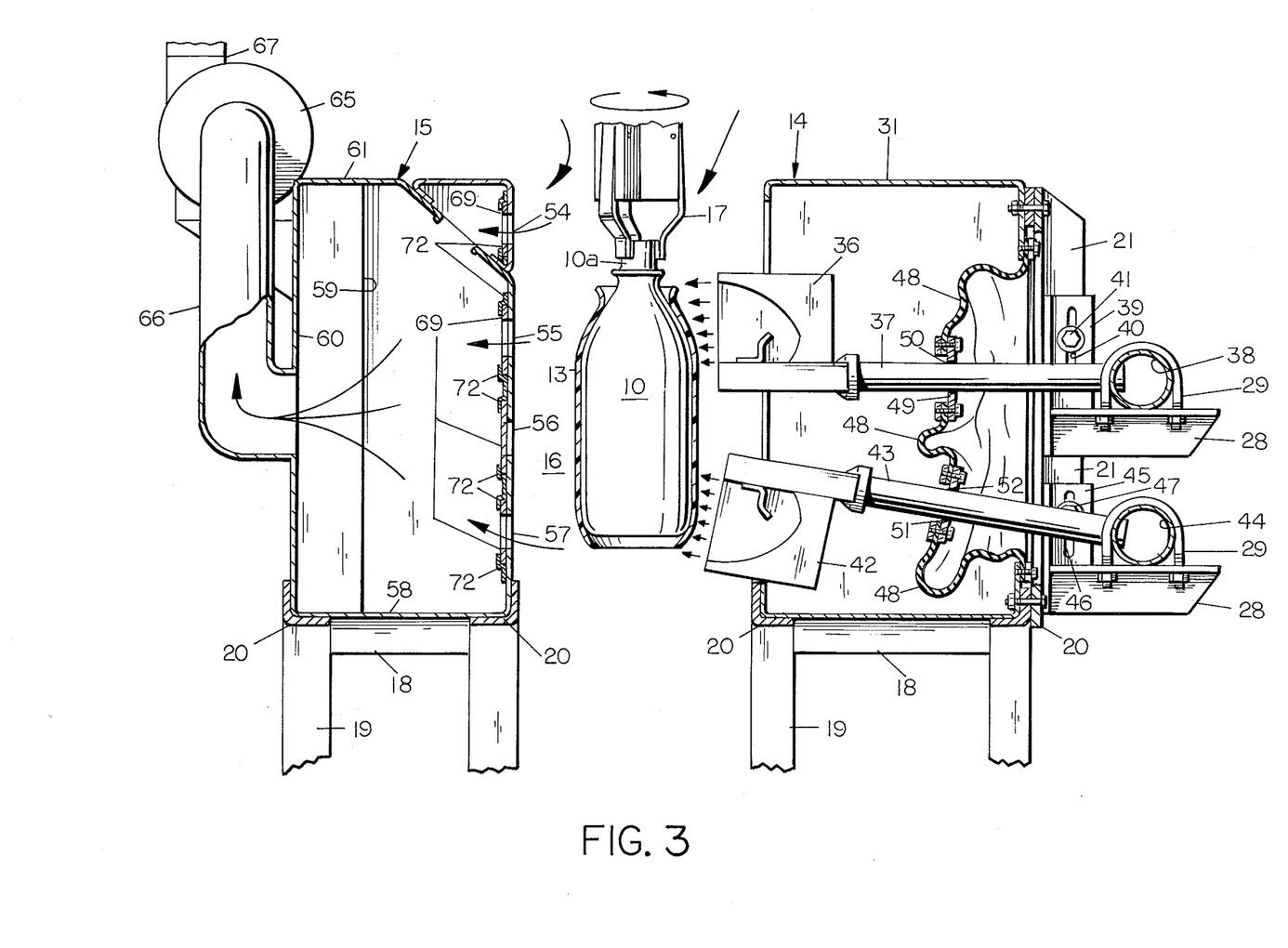
FIG. 3 is an end sectional elevational view in the second control zone of the oven taken along line 3—3 on FIG. 1.

With reference to FIGS. 1–3, the oven is constructed in two facing, spaced apart half sections. The one section represents the heater section 14 housing the infrared burners, to be described presently. The other section is the exhaust section 15 inducing a flow of air across the space 16 between sections 14 and 15. The conveyor includes a series of chucks 17 thereon grasping the bottles by their upper end finish portion 10a and are driven along the line 11 (plane 11 on FIGS. 2 and 3) approximately bisecting the space 16 between the oven halves.

The burner section 14 includes a framework 18 supported on legs 19 and longitudinal angle girders 20. A series of vertical beams 21 fastened to girders 20 provide the support means for mounting the various burner sections.

Referring to FIGS. 1 and 2, the forward part of the oven contains the first control zone 16a comprising infrared heaters made up of a plurality of side by side double infrared gas burners 22 each mounted on the end of a cantilever pipe 23 connected into a horizontal manifold 24.

The burners 22 are impingement type infrared generators that deliver high intensity, high density, infrared radiation (wave lengths of 2.5 microns and above). The burners are each on the order of 6 inches in lineal span mounted side by side along manifold 24. Costly enclosures and insulation are not normally as necessary in this type heating device as in the case of a convection heating oven. Infrared energy travels in a straight line from burner to material being processed with no loss to the surrounding atmosphere. Rated burner face temperature using natural gas mixture and firing in the open is 1700° F. Lower operating temperatures may be used depending upon radiant absorbability of the workpiece. The exact configuration of the burner is not illustrated in detail herein; however, by way of example, Model Series IG, Infra-Glo ™ Burners sold by Eclipse Fuel Engineering Company and described in their bulletin H-18, published October, 1970, is a satisfactory example of such unit.

The heads of burners 22 are constructed of cast iron and include a high quality refractory facing for high rate of radiant heat transfer. Burners 22 are constructed as a double section burner facing the mid body zone of bottle 10. Air/gas mixture is supplied by a mixing device (not shown) to a manifold 24 as a full premix at 8 inch w.c. mixture pressure. Either natural gas or L.P. gas may be used. Natural gas produces the greater BTU output of the burner.

Figure 2A:
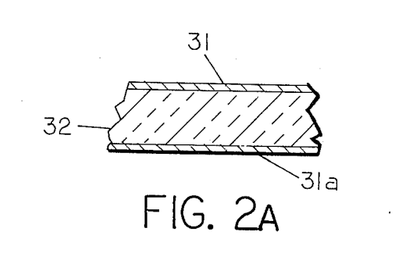
FIG. 2A is a detailed fragmentary sectional view of the oven wall comprised of a two ply sheet of metal enclosing an insulation layer, such as asbestos.

The elevation of the first zone section of burners 22 is adjusted at the two vertical brackets 25 bolted at 26 to vertical beams 21 through the vertical adjusting slot 27. Each bracket 25 includes a horizontal leg 28 which supports manifold 24 by the U-bolt clamps 29. The burners 22 may be adjusted as a group about the pivotal connection of the manifold 24 and the U-clamps 29 on bracket leg 28. The first section of burners 22 extends through an opening 30 at the inner facing surface of the burner section enclosure. The burner section 14 is enclosed at the top, bottom and end wall extension of the section by a double wall sheet metal 31, 31a spaced apart by insulation layer 32, such as is illustrated in FIG. 2A. The back of the burner section is covered by a flexible sheet cover 33 attached to frame girders 20 at the top and bottom and to a central metal shield 34 having apertures 35 each receiving a burner pipe 23. The back cover 33 contains the heated air in the oven chamber and enclosure and shields the plant environment therefrom, while providing for angular and vertical adjustment of the group of burners of the first zone on the trunion type mounting 28, 29.

The second control zone 16b of the burners in the aft part of the enclosure of heater section 14 is constructed with upper and lower banks of burners. A plurality of upper burners 36 are each supported on the end of a pipe 37. The end of pipe 37 is connected into the horizontal manifold pipe 38 which is supported by the similar U-bolt clamps 29, earlier described, bolted onto the horizontal leg 28 of the two upper brackets 39. The brackets 39 have slots 40 for bolting them onto the vertical beams 21. By the manner described earlier, the upper burners 36 may be adjusted angularly about a pivot point of the trunion style mounting of manifold 38 on the brackets 39 and U-bolt clamps 29; and the burners 36, as a group, may be adjusted vertically along beam 21 by adjusting slots 40 and bolt 41. A plurality of lower burners 42 are similarly mounted by their individual pipes 43 connected into a lower manifold 44 held by U-clamps 29 bolted onto horizontal leg 28 of the lower brackets 45. The same form of vertical and angular adjustment of burners 42 is provided by the slot 46 receiving bolt 47 fastening the bracket 45 onto a vertical beam 21.

The upper and lower burners 36 and 42, respectively, comprise right hand and left hand single infrared generators, such as Model Series IR, Infra-Rad™ Burners, sold by Eclipse Fuel Engineering Company, described in detail in their bulletin H-18-1 published December, 1972. The length of each burner in the lineal array is approximately 6 inches. The upper burners 36 are set opposite and facing the upper portion of the plastic sleeve 13 along the neck of the bottle, as shown on FIG. 3. Lower burners 42 are set opposite and facing the lower marginal portion of sleeve 13 along the heel and bottom of the bottle. The radiant heat of the burners 36 and 42 is projected laterally in the chamber 16 to complete the shrinkage of these two end portions of the sleeve 13 over the bottle contour.

As in the first zone of the burners of heater section 14, there is a flexible backing screen 48 fastened to the upper metal shield strip 49 provided with individual apertures 50 spaced lengthwise thereof to receive the several pipes 37. The intermediate section of screen 48 is fastened to the lower side of shield strip 49 and to the upper side of a lower metal shield strip 51 having the spaced individual apertures 52 to receive the several pipes 43 to the lower burners 42. The outer margins of flexible screen 48 are bolted onto the back of the heater section frame, as shown. In this manner, the upper and lower banks of burners 36 and 42 are permitted angular and vertical adjustment individually, as described earlier, and heated air is retained in the enclosure of the oven for exhaust in a manner to be described.

As seen on the plan view of FIG. 1, the first zone having the double burners 22 is somewhat longer than the second zone comprised of the upper and lower burners 36 and 42. The first zone is on the order of 5-6 feet in length; whereas, the second zone is preferably 3-4 feet in length. During movement of the bottle and sleeve lengthwise along oven chamber 16, the first zone of burners supplies the heat principally to the mid body of the plastic sleeve and shrinks that portion snugly onto the bottle. At the same time, the first zone of burners elevates the temperature of the plastic at the top and bottom portions of the sleeve so that as they enter the second control zone of the oven, these two portions of the sleeve complete their shrinkage onto the bottle.

Since the mid body portion has already shrunken onto the bottle, the heat is directed away from this area, to a large degree, to complete shrinkage of the two end portions of the sleeve and avoid overheating or scorching the mid portion of the plastic wrap. This control of the application of the heat is further enhanced by the structure and operation of the exhaust section 15 of the oven, which will now be described.

Referring to FIGS. 1-5, exhaust section 15 is supported on similar horizontal frame girders 20 connected at the opposite ends thereof onto the framework 18 and legs 19. The enclosure of this section is comprised of an elongated inner facing of sheet metal 53 provided with four longitudinal rows of ports 54-57, inclusive, numbered in order from top to bottom on FIG. 4. The inner facing 53 is stainless steel of single ply sheet metal attached to the bottom wall 58, rear walls 59 and 60, top wall 61 and end walls 62 and 63 of the enclosure, each of the walls 58-63 being comprised of double wall sheet metal (steel) with a layer of insulation (asbestos fiber) between the sheet metal. A larger section detail of such wall construction is exemplified on FIG. 2A. The back wall 59 of the two extremities of exhaust section 15 curve outwardly and blend with the back wall 60 in the central portion of the oven to provide an enlarged plenum chamber 64. A blower 65 (FIGS. 2 and 3) has its inlet connected into pipe 66 connected into chamber 64 along the back wall 60. The outlet side of blower 65 is connected to an exhaust stack 67. Blower 65 is driven by conventional power, such as electric motor drive (not shown), to exhaust air from chamber 64 and create a flow of air into plenum 64. This induced flow of air is controlled by three sets of adjustable damper means slidably mounted along each of the rows of exhaust ports 54-57 through the facing 53 of the enclosure. Each damper means in a row of ports comprises a series of three sheet metal strips 68-70 provided with circular holes 71 spaced along the strip on centers to match the spaced ports 54 in facing 53. The left hand dampers 68 (FIG. 4) are supported in slides, such as 72 (FIGS. 2 and 3), fastened in place on the back surface of metal facing 53 at the appropriate elevation. Dampers 68 are movable horizontally in the slides 72 and are adjusted from the left hand side of the enclosure (FIG. 4) at the end protruding portion 68a. The central set of damper means 69 is slidably adjusted along the slides 72 thereof by manipulating the in-turned end 69a of the dampers. An access opening (not shown) in the enclosure is provided strategically for manipulating these dampers. The right hand set of damper means 70 is adjusted along their slides 72 by the angled end portions 70a.

The various dampers are set in sections along the exhaust enclosure facing 53 to effect a controlled flow of air. Several things are accounted for in the settings of the various damper means 68-70. The first objective is to establish a flow of air across the mid portion of the bottle, such as illustrated on FIG. 2, such that the radiant heat from the first zone of burners 22 assures shrinkage of the mid body portion of the sleeve 13 onto bottle 10. This is accomplished by setting the dampers 68 such that the ports 56 therealong are open (see FIG. 5). The other three dampers 68 are set so that the ports 54, 55 and 57 are closed or nearly so. The second objective in air flow control is to cool the conveyor equipment by inducing air flow from overhead (see arrows at the top of the chamber 16 on FIGS. 2 and 3). Inasmuch as the chucks 17 enter the oven chamber 16 (from the left hand side on FIGS. 1 and 4) at a relatively lower temperature near ambient, this air flow down over the chucks is not as significant in the early stages of travel in the oven as near the mid part of the oven. Accordingly, the dampers 69 in this intermediate location along the exhaust section facing are adjusted differently. The top two dampers 69 are set to open the ports 54 and 55, the third damper 69 is now closed and the bottom damper 69 is open. These settings compensate for the air flow rate in the enlarged plenum chamber 64 to the pipe 66, that is the ports 56 in this region are located directly across from the outlet of plenum 64 and by setting the damper 69 therefor closed, a flow of air of quantity is assured into the upper two ports 54, 55 and the lower ports 57. These damper settings in the second (intermediate) span along the exhaust facing of the oven assure a greater air flow downwardly across the chucks to cool them and diversify the radiant heat applied by the latter stages of travel of the sleeve past burners 22 such that the top and bottom portions of the plastic receive more heat than before preparing them for shrink when traveling past the after burners 36, 42.

Figure 4:
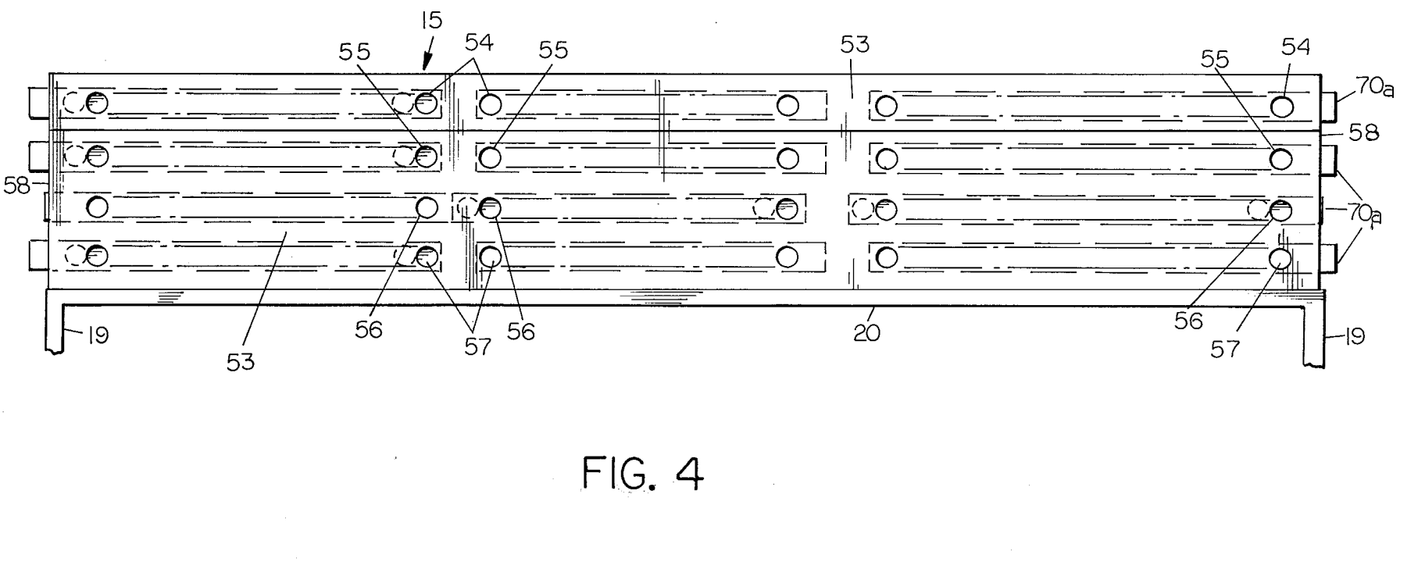
FIG. 4 is a side elevational view of the exhaust section of the oven taken along line 4—4 on FIG. 1.
Figure 5:
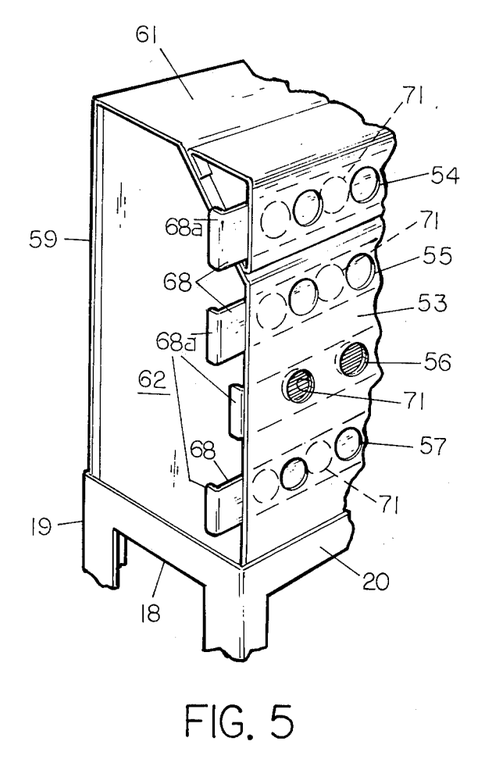
FIG. 5 is a partial perspective view of one end of the exhaust section of the oven shown on FIG. 4, illustrating air flow control through the use of adjustable horizontal dampers regulating air flow through exhaust apertures.

Turning now to the third set of dampers 70 located downstream of the oven, the settings are nearly the same. The top two ports 54 and 55 are open, again to stimulate cooling of the chuck and concentration of the radiant heat generated by burners 36 onto the upper portion of the sleeve. Also, this section of the exhaust chamber is farther from the plenum outlet pipe 66 and therefore is at a lower pressure; and, accordingly, the opening of these dampers is needed to compensate for this factor. The third row of ports 56 have the damper 70 fully closed to enhance keeping heat from the mid body portion of sleeve 13, which has already been shrunken tightly on the bottle in that region thereof. The lower row of ports 57 are open by the setting of damper 69. This directs heat generated by lower burners 42 in the second zone 16b of the oven and onto the lower portion of sleeve 13 for shrinking that part of the plastic tightly around the heel and onto the bottom of the bottle.

Figure 6:
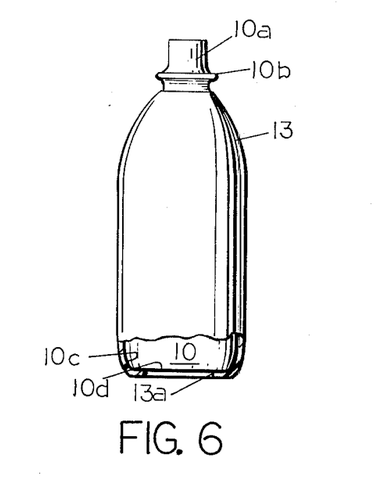
FIG. 6 is an elevational view of a bottle product with shrunken plastic sleeve wrap thereon produced in accordance with the invention.

The bottle and plastic sleeve emerge from the oven chamber 16 at the right hand end with a full wrap snugly on the bottle such as shown on FIG. 6. The bottle 10 shown herein includes (but need not have) an annular carrying ring 10b below the finish 10a. The sleeve wrap 13 extends just beneath this ring 10b to within ¼ to ⅛ inch thereof. The wrap is tightly shrunken over the neck and shoulder of the bottle, over the body, then around the heel 10c and onto the bottom 10d. The end margin of the plastic of the wrap at the bottom wall is indicated at 13a.

SUMMARY OF OPERATION

In operation, the apparatus just described performs a method of shrinking a plastic wrap over the exterior surface of a glass bottle from the substantially cylindrical form of sleeve which is axially slipped over the exterior of the bottle prior to conveying it into the oven structure. The bottle and sleeve then move together into the oven and the sleeve is first exposed to the heating provided in the first control zone by infrared burners. As an example, using wrap sleeves of polyethylene foam plastic having a thin polyethylene film skin on the outside, the operating temperature of the oven is in the range 600°-900° F using gas fired infrared burners and assuming a production rate of about 125 BPM in a 9 foot long oven.

In the first control zone 16a of the oven, the bottle passes in front of burners 22 which are angled and set to a height to heat the mid body portion of the sleeve opposite the mid body of the bottle (the large diameter portion). Upon entry to the oven, the bottles and sleeves are rotated up to a speed in the range of 150-300 RPM, in this example the speed of rotation of 250-275 RPM being preferred. During the exposure in front of the burners 22, the top portion of the plastic wrap is exposed to radiant heat so as to soften the material and elevate it in temperature, but not sufficiently to shrink it. But, the mid body portion of the wrap is shrunken onto the bottle. The rotation of the bottle and sleeve wrap maintains the limp upper end portion of the plastic sleeve erect and somewhat billowed out by centrifugal force applied thereto as is illustrated on FIG. 2. To some extent, the bottom end portion of the sleeve is similarly billowed out by centrifugal force, but since the burners 22 are directed away from that area, the elevation of temperature and limp condition of that part of the wrap is less pronounced and the plastic stays closer to the bottle.

As the bottle is passing this first control zone of burners 22, the exhaust section 15 controls the flow of air across the chamber 16 through which the bottles are moving and further concentrates the radiant heat for shrinking at the mid body of the bottle and to a lesser extent heat at the upper portion of the sleeve. This is accomplished by the first set of dampers by regulating flow into the exhaust compartment through the row of ports 56 located at or just a little below the mid body of the bottle. Approaching the mid point of the oven span, the dampers of the second set are adjusted to allow more air flow into the top part of the exhaust section through the two top rows of ports 54 and 55, which does two things: first, the ambient air is drawn from over the oven chamber 16 into the chamber and past the chucks 17, cooling them; and, second, draws more of the radiant heat from the last stages of the burners 22 onto the top portion of the sleeve to raise its temperature ready for shrinking. The sequence of control is designed to next shrink the top portion of the sleeve onto the bottle neck. This is finalized in the second control zone 16b of the oven in which the top of the sleeve passes in front of the upper burners 36 (FIG. 3) which directly applies the heat to this much of the sleeve. At this point, the bottle is passing the third set of dampers in the exhaust section set to assure flow of air and heat in the top part of the oven. Since the mid body has shrunken onto the bottle, heat is directed away from this area of the sleeve. The lower burners 42 in this second control zone 16b simultaneously direct the radiant heat onto the lower portion of the sleeve to elevate its temperature. The open dampers of the bottom row of exhaust ports 57 assist in concentrating the heat for doing this shrinking of the bottom part of the sleeve over the heel and onto the bottom of the bottle. The product emerges from the oven beyond the zone 16b in the form of the plastic sleeve wrapped bottle shown on FIG. 6. The top marginal edge of the sleeve has now snugly encircled the neck just under the ring 10b; whereas, the bottom marginal edge 13a of the plastic sleeve has curled under the bottom of the bottle and encircled the heel radius portion. The top and bottom margins, principally at the top, are free of wavy and wrinkled appearance. The sleeve wrapped bottle has a relatively tough, cushioned covering over the exterior surface that is in a snug fitting conforming, encircling engagement substantially encapsulating the bottle. The carrying ring, finish portion and a central bottom area are, of course, left uncovered. The need for exposure of these surfaces in function and use of the bottle should be readily apparent.

In the description of the preferred embodiment, the preferred example of the infrared burners (radiant heat generators) is given as a gas fuel fired infrared generator. Within the scope of the invention, electrical infrared generators (burners) as may be obtained commercially are suited for use. The reason for a preference is, in this case, the enablement of faster shrink and shorter ovens for production utilization.

Having described a preferred embodiment of the invention and illustrated in connection therewith a preferred form of apparatus for carrying out the method of the invention, it should be understood that further modifications may be resorted to without departing from the spirit and scope of the appended claims.

What is claimed is:

1. An apparatus for heat shrinking a pre-oriented plastic sleeve on the exterior of an article comprising
    conveyor means moving the articles in vertical position and having sleeves of heat shrinkable plastic carried exteriorly thereon in a horizontal straight line path,
    an elongated oven comprised of a heater section and an exhaust section each disposed on opposite sides of said path, the burner section comprising
    a first heat control zone comprised of an elongated span of infrared burners,
    means mounting said burners side by side facing the path of said conveyed articles, said means including a vertical height adjustment and an angular adjustment of the position of the burners with respect to the articles for locating the burners opposite the mid body of the articles,
    a second heat control zone comprised of upper and lower elongated spans of infrared burners,
    means mounting said upper and lowr spans of said burners individually, each said means including a vertical height adjustment and an angular adjustment of the position of the upper and lower burners with respect to the articles for respectively locating the upper span of burners directed at the upper portion of the articles and the lower span of burners directed at the lower portion of the articles, and
    the exhaust section including means for moving air across the oven and into said exhaust section, a facing opposite the burner section thereof, plural horizontal rows of exhaust ports arranged along said facing, plural sets of dampers, and means supporting said dampers in said exhaust ports for movement with respect to said sets of the exhaust ports in each of the horizontal rows thereof, each of said dampers being operable for opening and closing one or more of the exhaust ports in the rows thereof for regulating movement of air within the oven.

2. The apparatus of claim 1, in which said infrared burners are gas fired infrared heat generators.

3. Apparatus for heat treatment of glass bottles having an unfinished plastic covering thereon comprising
    an elongated oven for heating bottles moved therethrough lengthwise,
    a conveyor suspending bottles in vertical upright position having unfinished plastic coverings on the exterior thereof, and movable the length of the oven,
    said oven including a heating section comprised of two adjacent, consecutive zones of heating elements,
    the first zone being comprised of an elongated infrared heat generating element, and
    means for mounting said first element along the path of the conveyor and directed at the mid body of the bottle,
    the second zone being comprised of two elongated infrared heat generating elements,
    means for mounting the first of the two said elements along the path of the conveyor and directed at the neck portion of the bottle, and
    means for mounting the second of the two said elements along the path of the conveyor and directed at the bottom end of the bottle.

4. The apparatus of claim 3 in which the elongated infrared heat generating elements in the first and second said zones of the oven are each substantially parallel to the path of movement of the conveyor.

5. The apparatus of claim 3 in which the said oven includes an elongated exhaust section along the conveyor path and on the opposite side thereof from said heating section of the oven, said exhaust section including an elongated wall facing the path of the bottles and including plural horizontal rows of exhaust ports that are vertically spaced on said wall facing, and damper means supported by said wall facing for movement thereon in opening and closing said exhaust ports.

6. The apparatus of claim 5, in which the damper means comprises plural slidably mounted dampers in each of the plural rows of said exhaust ports, said dampers regulating the air flow to the exhaust section of the oven along the length of the said two burner zones.

7. The apparatus of claim 6, including a blower means connected to the exhaust section of the oven for drawing air across the path of the conveyor and into the exhaust section through the exhaust ports, the flow being under regulation by the plural adjustable dampers.

8. The apparatus of claim 7 in which the oven includes an open top along the path of the conveyor, said dampers controlling air flow downwardly into the oven exhaust section, thereby circulating cooler air from outside the oven over the conveyor means that is carrying the bottles along the length of the oven.

9. The apparatus of claim 3 in which the elongated infrared heat generating element of the first zone comprises a gas fuel operated infrared burner means.

10. The apparatus of claim 3 in which the two elongated infrared heat generating elements of the second zone each comprise a gas fuel operated infrared burner means.

* * * * *